(No Model.)

G. STAIB.
COVER FOR FRUIT JARS.

No. 404,059. Patented May 28, 1889.

WITNESSES
Wm A. Lowe
Wm Wagner

INVENTOR
G. Staib
by his attorneys
Roeder & Briesen

UNITED STATES PATENT OFFICE.

GUSTAV STAIB, OF TOMPKINSVILLE, NEW YORK.

COVER FOR FRUIT-JARS.

SPECIFICATION forming part of Letters Patent No. 404,059, dated May 28, 1889.

Application filed April 5, 1889. Serial No. 306,099. (No model.)

*To all whom it may concern:*

Be it known that I, GUSTAV STAIB, of Tompkinsville, Richmond county, State of New York, have invented an Improved Cover for Fruit-Jars, of which the following is a specification.

This invention relates to an improved cover for fruit-jars, and more particularly to the means for readily closing the air-vent.

The invention consists in the various features of improvement more fully pointed out in the claims.

Figure 1:
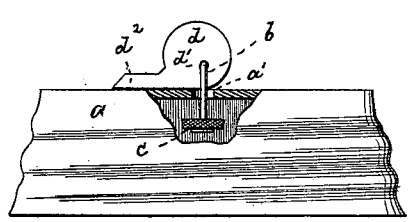
Figure 2:
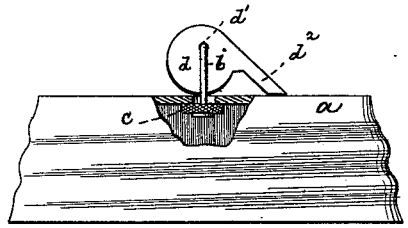
Figure 3:
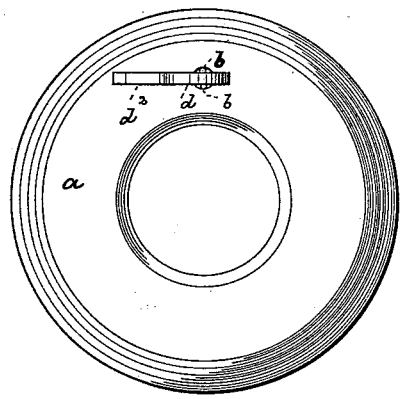
Figure 4:
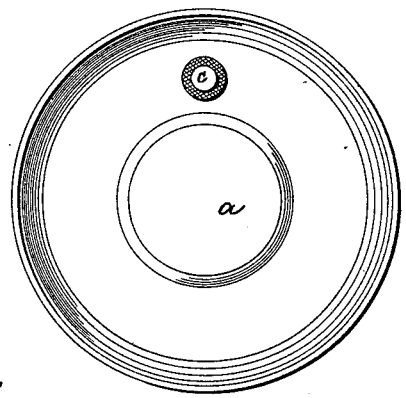
Figure 5:
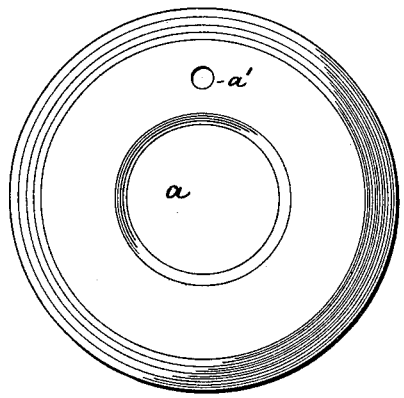

In the accompanying drawings, Figure 1 is a sectional side view of my improved cover, showing the vent open. Fig. 2 is a similar view showing the vent closed. Fig. 3 is a top view, and Fig. 4 a bottom view, of the cover. Fig. 5 is a top view with the cam removed.

The letter $a$ represents a cover adapted to be fastened upon the top of a fruit-jar or similar article, as usual. The cover is provided with a perforation, $a'$, through which passes a bail, $b$. The shanks of this bail are secured to a disk, $c$, made of rubber or similar material. The outer or bent end of the bail passes through a perforation, $d'$, of a cam, $d$. This cam is provided with a handle, $d^2$, having a beveled end, as shown.

If the vent is to be opened, the cam $d$ is swung into the position shown in Fig. 1. In this position the handle $d^2$ rests flush upon the face of the cover $a$, while the bail $b$ is projected to its maximum extent into the cover to hold the disk $c$ away from the vent-opening $a'$.

If the vent is to be closed, the cam $d$ is swung into the position shown in Fig. 2. Here the beveled edge of the handle $d^2$ rests upon the face of the cover, while the bail is drawn outward to tightly hold the disk against the opening.

What I claim is—

1. The combination of perforated cover $a$ with the bail $b$, disk $c$, and perforated cam $d$, the bail being secured to the disk and passing through the perforated cam, substantially as specified.

2. The combination of perforated cover $a$ with the bail $b$, disk $c$, and perforated cam $d$, the cam $d$ having handle $d^2$, that is provided with a beveled edge, substantially as specified.

GUSTAV STAIB.

Witnesses:
 HENRY E. ROEDER.
 F. V. BRIESEN.